United States Patent [19]

Thompson et al.

[11] 4,341,368
[45] Jul. 27, 1982

[54] MOLD

[75] Inventors: Donald R. Thompson; John R. White, both of Wadsworth, Ohio

[73] Assignee: The Goodyear Tire & Rubber Company, Akron, Ohio

[21] Appl. No.: 186,050

[22] Filed: Sep. 11, 1980

[51] Int. Cl.³ ............................ B29C 5/00; B30B 5/02
[52] U.S. Cl. ...................................... 249/142; 249/65; 425/405 H
[58] Field of Search .............. 249/65, 142; 425/405 H

[56] References Cited

U.S. PATENT DOCUMENTS 3,104,441  9/1963  Smith ................................ 249/65
3,184,528  5/1965  Norwalk ..................... 425/405 H X
3,561,079  2/1971  Anderson .................. 425/405 H X
3,768,769 10/1973  Sachs ................................. 249/65
3,822,106  7/1974  Sirera ............................. 249/65 X Primary Examiner—J. Howard Flint, Jr.
Attorney, Agent, or Firm—J. D. Wolfe

[57] ABSTRACT

A mold comprising an elongated hollow cylinder having at least two parts that can be locked to form said cylinder, a core having an inflatable cover, said inflatable cover having means to fix the cover on said core, an upper and lower seal for said core capable of forming a tight seal with the core when the cover is inflated on the parts of the cylinder.

2 Claims, 2 Drawing Figures

MOLD

TECHNICAL FIELD

This invention relates to a mold for molding an elongated hollow microcellular shock absorber.

BACKGROUND ART

Large elongated hollow microcellular shock absorbers having dimensions, for example 122 centimeters outside diameter×30.5 centimeters inside diameter×122 centimeters, are desirable as dock fenders and have been made previously by using a cardboard core inside a steel cylinder as a mold. The cardboard case was removed from the finished casting by destroying with water.

Since the polyurethane microporous or cellular reactants expand during casting pressure develops that cracks or warps the core. This results in cast dock fenders not fitting on dock fender supports or having unsightly ends.

DISCLOSURE AND PRACTICE OF THE INVENTION

We have discovered that if the cardboard core is replaced with a solid core having an inflatable cover thereon the resulting mold gives a molded article having a relatively uniform hollow section and the inflated cover provides an excellent seal to prevent loss of the reactants.

Figure 1:
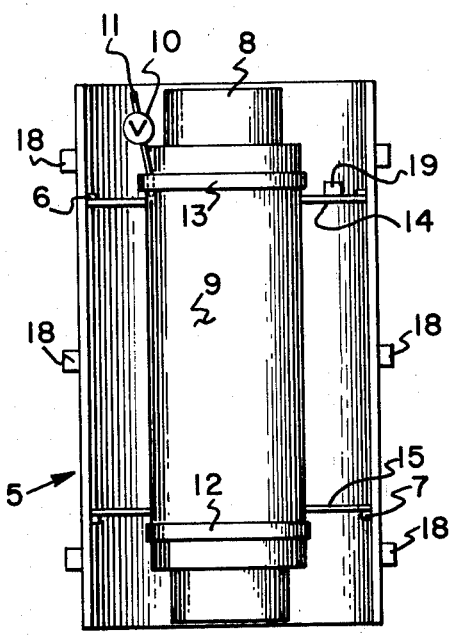
Figure 2:
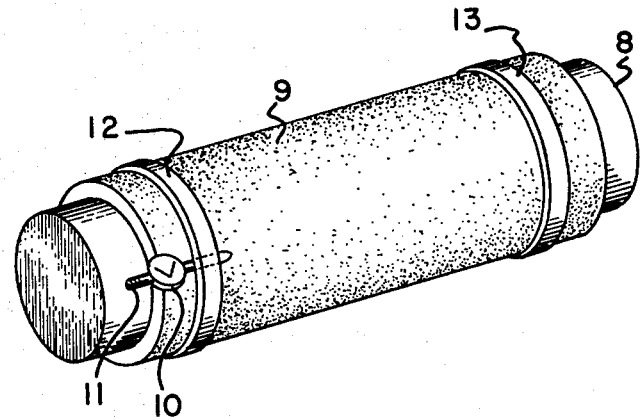

The nature and advantages of this invention can be more readily understood by reference to the drawings wherein:

FIG. 1 is a vertical cross-sectional view through a cylindrical multiple part mold having a cylindrical core member positioned therein; and FIG. 2 is a perspective view of the core having an inflatable cover positioned thereon.

Referring more specifically to FIG. 1 the numeral 5 indicates one half of a cylindrical mold containing sealing ring flanges upper 6 and lower 7 respectively. In axial alignment in the center of the mold a core 8 of metal or other suitable strength material having an inflatable cover 9 with associated valve means 10 and air line 11 is positioned. The inflatable cover can be held in position on the core by any well known means such as the adjustable clamp bands 12 and 13 respectively on the upper and lower portion of the core. Suitable seal members 14 and 15 respectively for the top and bottom of the mold are shown in position in the mold and around the core. It should be noted that the seal member can be metal, wood or like material and is attached or locked at its peripheral edges under the flange rings 6 and above flange ring 7 to hold the seal members against the face of the expanding molding material.

With the core and sealing members in position the elastomeric cover 9 is inflated via line 11 to cause the cover to inflate and form a tight fit with sealing members 14 and 15.

The cylinder cover is preferably made of elastomeric coated fabric such as acrylonitrile-butadiene rubber or other well known rubbers. Also it is preferred that the fabric be of a weave that restricts the ability of the fabric to expand in the direction of the diameter of the core to maintain the inflation and expansion of the cover to about 0.5 to 4 centimeters, and preferably 1 to 3 centimeters in diameter, so the core can be readily removed from the coating when air is removed and a vacuum is drawn on line 11 by the proper manipulation of valve 16 to connection to vacuum line 17.

BEST MODE FOR CARRYING OUT THE INVENTION

The nature of this invention and its advantages can be appreciated by reference to the following example where all parts are by weight unless otherwise indicated.

The mold was assembled and locked with locks 18. Valve 16 was turned to inflate the cover. A spray coat of mold release was applied to the inside of the mold and expandable elastomeric cover before assembly. A polyurethane reaction mixture of methane diphenyl diisocyanate, a high and low molecular weight polyol, viz 3000, and a butane diol was charged to the mold through opening 19. To fill the mold after the mixture had foamed after standing overnight the pressure on line 11 was vented and a vacuum pulled thereon. This permitted the core to be pulled out of the center of the casting and the mold was opened by unlocking means 8 to permit the mold half to be opened. This permitted the seals 14 and 15 to be removed to expose the hollow cylindrical dock fender.

While certain representative embodiments and details have been shown for the purpose of illustrating the invention it will be apparent to those skilled in this art that various changes and modifications may be made therein without departing from the spirit or scope of the invention.

We claim:

1. A mold comprising an elongated hollow cylinder having at least two parts that can be locked to form said cylinder, a core axially aligned therein and having an inflatable cover thereover, said inflatable cover having means to fix the cover on said core, upper and lower seal members positioned between said cylinder and said core with said seal members being in loose association with said cover, and a means to inflate said cover to contact and form a tight seal between said cover and said upper and lower seal members.

2. The mold of claim 1 wherein the cover is composed of elastomeric coated fabric.

* * * * *